(12) United States Patent
Krauthgamer et al.

(10) Patent No.: US 7,587,621 B2
(45) Date of Patent: Sep. 8, 2009

(54) COMPUTER SYSTEM MANAGEMENT AND THROUGHPUT MAXIMIZATION IN THE PRESENCE OF POWER CONSTRAINTS

(75) Inventors: Robert Krauthgamer, Albany, CA (US); Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 11/557,587

(22) Filed: Nov. 8, 2006

(65) Prior Publication Data

US 2008/0109811 A1 May 8, 2008

(51) Int. Cl.
*G06F 1/00* (2006.01)
(52) U.S. Cl. ...................................................... 713/500
(58) Field of Classification Search .................. 713/500
See application file for complete search history.

(56) References Cited

U.S. PATENT DOCUMENTS

| | | | |
|---|---|---|---|
| 6,397,680 B1 * | 6/2002 | Levesque et al. .............. | 73/602 |
| 6,795,927 B1 | 9/2004 | Altmejd et al. | |
| 6,795,928 B2 | 9/2004 | Bradley et al. | |
| 7,434,073 B2 * | 10/2008 | Magklis et al. ............. | 713/320 |
| 2003/0023885 A1 * | 1/2003 | Potter et al. ................. | 713/300 |
| 2003/0055969 A1 | 3/2003 | Begun et al. | |
| 2003/0056126 A1 | 3/2003 | O'Connor et al. | |
| 2004/0037346 A1 * | 2/2004 | Rusu et al. .................. | 374/121 |

OTHER PUBLICATIONS

Xizhou Feng, Rong Ge, and Kirk W. Cameron, Power and Energy Profiler of Scientific Applications on Distributed Systems, Proceedings of the 19th IEEE International Parallel and Distributed Processing Symposium (IPDPS'05), Department of Computer Science and Engineering, University of South Carolina.
Leandro Becker, Marco A. Wehrmeister, Carolos E. Pereira, Power and Performance Tuning in the Synthesis of Real-Time Scheduling Algorithms for Embedding Applications, Computer Science Institute, UFRGS, Brazil, Sep. 2004, pp. 169-174.
Inki Hong and Miodrag Potkonjak, Power Optimization in Disk-Based Real-Time Application Specific Systems, 1996 IEEE, Computer Science Department, University of California, Los Angeles, CA, pp. 634-637.

\* cited by examiner

*Primary Examiner*—Thomas Lee
*Assistant Examiner*—Mohammed H Rehman
(74) *Attorney, Agent, or Firm*—Cantor Colburn LLP; Brian Lambert

(57) ABSTRACT

Methods are provided for maximizing the throughput of a computer system in the presence of one or more power constraints. Throughput is maximized by repeatedly or continuously optimizing task scheduling and assignment for each of a plurality of components of a computer system. The components include a plurality of central processing units (CPUs) each operating at a corresponding operating frequency. The components also include a plurality of disk drives. The corresponding operating frequencies of one or more CPUs of the plurality of CPUs are adjusted to maximize computer system throughput under one or more power constraints. Optimizing task scheduling and assignment, as well as adjusting the corresponding operating frequencies of one or more CPUs, are performed by solving a mathematical optimization problem using a first methodology over a first time interval and a second methodology over a second time interval longer than the first time interval. The first methodology comprises a short term heuristic solver for adapting to computer system changes that occur on a short time scale, and the second methodology comprises a long term solver having greater accuracy and greater computational complexity than the first methodology.

1 Claim, 3 Drawing Sheets

COMPUTER SYSTEM MANAGEMENT AND THROUGHPUT MAXIMIZATION IN THE PRESENCE OF POWER CONSTRAINTS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computer systems and, more specifically, to a method and a system for maximizing the throughput of a computer system in the presence of one or more power constraints.

2. Description of Background

From small clusters of computers to large supercomputers, peak power consumption places a major constraint on the scalability of computer systems. For purposes of cost effectiveness, a computing system may initially comprise a small number of computing elements. At some point, it may be necessary to scale the computing system by adding additional computing elements so as to increase the overall processing capacity of the system. However, each of the components added to the system also increases the overall power consumption of the aggregate system. Energy constraints may prevent the use of computer systems which are capable of providing high throughput. In particular, peak power consumption is constrained such that computer processors are unable to operate at full computational capacity. What is needed is a control system that maximizes throughput in view of energy constraints.

SUMMARY OF THE INVENTION

Methods are provided for maximizing the throughput of a computer system in the presence of one or more power constraints by repeatedly or continuously optimizing task scheduling and assignment for each of a plurality of components of the computer system. The components include a plurality of central processing units (CPUs) each operating at a corresponding operating frequency. The components also include a plurality of disk drives. The corresponding operating frequencies of one or more CPUs of the plurality of CPUs are adjusted to maximize computer system throughput under one or more power constraints. Optimizing task scheduling and assignment, as well as adjusting the corresponding operating frequencies of one or more CPUs, are performed by solving a mathematical optimization problem using a first methodology over a first time interval and a second methodology over a second time interval longer than the first time interval. The first methodology comprises a short-term heuristic solver for adapting to computer system changes that occur over the first time interval. The second methodology comprises a long-term solver for adapting to computer system changes that occur over the second time interval, wherein the second methodology has greater accuracy and greater computational complexity than the first methodology.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution wherein the components of a computer system are proactively controlled so as to limit power consumption with minimal degradation in computer system throughput. By limiting power consumption in this manner, these components may be packed more densely than what is currently practicable while still conforming to predetermined limits on power dissipation and power consumption.

BRIEF DESCRIPTION OF THE DRAWINGS

The subject matter, which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Like reference numerals are used to refer to like elements throughout the drawings. The detailed description explains the preferred embodiments of the invention, together with advantages and features, by way of example with reference to the drawings.

DETAILED DESCRIPTION OF THE INVENTION

The following description of systems and methods for maximizing the throughput of a computer system in the presence of power constraints utilizes the following terms:

"Workload" is defined as the amount of input/output (I/O) utilization, processor utilization, or any other performance metric of servers employed to process or transmit a data set.

"Throughput" is the amount of workload performed in a certain amount of time.

"Processing capacity" is the configuration-dependent maximum level of throughput.

"Frequency throttling" is an illustrative example of a technique for changing power consumption of a system by reducing or increasing the operational frequency of a system. For example, by reducing the operating frequency of a processor under light workload requirements, the processor (and system) employs a significantly less amount of power for operation, since power consumed is related to the power supply voltage and operating frequency. Although frequency throttling has been applied to central processing units (CPUs), the operational frequency or speed of system components other than CPUs may also be adjusted or controlled. As a general consideration, the operational frequency or speed of a component may be related to the energy consumption level of that component. Any of several techniques may be employed to adjust or control the frequency of a system component. These may, but need not, include changing the system supply voltage or controlling a clock gate to eliminate a portion or fraction of a clock signal. Changing the system supply voltage is an effective technique for adjusting the operational frequency of a system component, but a processing delay may occur until this voltage stabilizes. Controlling the clock gate will not cause a substantial processing delay. Illustratively, the embodiments disclosed herein may utilize any of a fixed set of operational frequencies available to a system component. The fixed set of operational frequencies is selected to provide energy efficient operation. Energy efficient operation often exhibits a non-linear dependence on processing speed, thus making system optimization more difficult. Accordingly, less efficient but readily available technologies may be used to provide system optimization, such as permitting a CPU to momentarily exceed its power budget.

Figure 1:
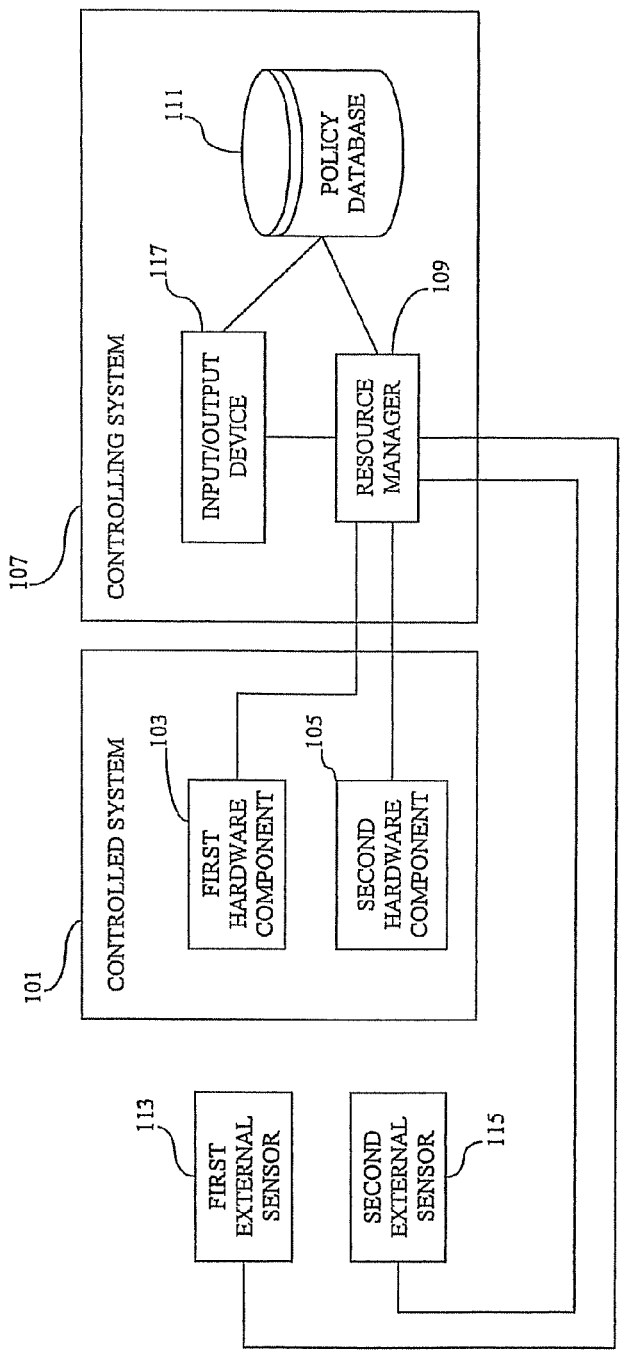
FIG. 1 is a block diagram illustrating an exemplary embodiment of a system for maximizing the throughput of a computer system under peak power constraints.

FIG. 1 is a block diagram illustrating an exemplary embodiment of a system for maximizing the throughput of a computer system under peak power constraints. The system is capable of proactively managing and controlling large-scale computer systems ranging from small clusters to large data centers and supercomputers. Since these large-scale computer systems are to be managed and controlled, they are referred to hereinafter as a controlled system 101.

In the illustrative example of FIG. 1, controlled system 101 includes a first hardware component 103 and a second hardware component 105. However, a typical controlled system 101 includes numerous hardware components such as computing devices, storage devices, I/O and network devices, cooling devices, and so forth. Each of these component categories could, but need not, be implemented using a plurality of virtually identical devices. A computing device could, for example, be implemented using a general purpose computer equipped with one or more central processing units (CPUs), random access memory (RAM), one or more hard disk drives, and a network adapter, and capable of executing an operating system such as Linux. The components could be organized in various architectures, e.g., flat (a group of standalone computers) or hierarchical (grouped into clusters of servers/cabinets/chassis in which peripherals are shared).

A controlling system 107 is employed to proactively manage and control controlled system 101. Controlling system 107 is capable of interacting with a plurality of components of controlled system 101. Illustratively, controlling system 107 is implemented using a software program running on a general-purpose computer referred to as a resource manager 109. Resource manager 109 is capable of accessing a policy database 111 stored on a computer-readable storage medium. Controlling system 107 could, but need not, be a part of controlled system 101. Controlling system 107 controls controlled system 101 by repeatedly or continuously receiving information from the hardware components of the controlled system (such as first hardware component 103 and second hardware component 105) related to the current configuration of the components, workload of the components, and performance of the components. Based upon this received information, controlling system 107 provides first and second hardware components 103, 105 with electric power budgets and configuration changes. An electric power budget specifies an upper bound on power consumption for a component. Illustratively, a component may, but need not, be responsible for maintaining adherence to this electric power budget.

Controlling system 107 controls assignment of tasks to the hardware components such as, for example, migrating a task from first hardware component 103 to second hardware component 105. Controlling system 107 maintains a set of power constraints while maximizing throughput of controlled system 101. This functionality is implemented by controlling system 107 receiving one or more external inputs from external sources such as a first external sensor 113 and a second external sensor 115. First external sensor 113 may represent a temperature sensor, an electric power controller, or another type of sensor. Similarly, second sensor 115 may represent a temperature sensor, an electric power sensor, or another type of sensor. Controlling system 107 also includes an input/output device 117 for accepting an input from a human operator and for providing an output to a human operator. In response to at least one of first external sensor 113, second external sensor 115, or input/output device 117, resource manager 109 modifies power constraints and/or optimization parameters for controlled system 101.

Controlling system 107 interacts with first and second external sensors 113, 115 and first and second hardware components 103, 105 to monitor controlled system 101 on a continuous or repeated basis. Typically, this monitoring is periodic and performed at fixed intervals such as every five seconds. Additionally or alternatively, this monitoring may include resource manager 109 sending a message to input/output device 117 in response to at least one of first external sensor 113 or second external sensor 115 sensing a predetermined event. During this monitoring process, controlling system 107 receives updated information from first hardware component 103 and second hardware component 105 pertaining to each component's current physical and logical configurations, as well as each component's current workload and performance.

Physical configuration data includes a component's installed hardware (such as RAM), the hardware's settings (e.g., CPU frequency and voltage), and available peripherals (e.g., active network and storage devices). Logical configuration data includes information regarding an operating system installed on the component, as well as any runtime parameters for the component. Workload data contains statistics regarding the task or tasks currently performed by the component. For example, if the component is a computing device, workload data includes a relative intensity for each of a plurality of tasks in terms of CPU, memory, disk space, or network access. If the component is a network or storage device, workload data includes the number and intensity of flows that traverse the component. Performance data includes information regarding the utilization of the component (such as a cache missed count), the progress of any task or tasks assigned to the component (such as the number of each task's instructions that have been executed), and the current physical conditions under which the component is operating (such as a device's power consumption and internal temperature).

Controlling system 107 outputs an electric power budget and configuration changes to each of a plurality of components, such as first hardware component 103 and second hardware component 105. The power budget is a limit on the actual power consumption of the component. If controlling system 107 has control over an electric power supply, then the controlling system can physically enforce power budget limits for one or more components as, for example, by disconnecting power to components that violate the limit. Alternatively or additionally, each component is responsible for adhering to its power budget by routinely measuring its own power consumption and taking action in response thereto when measured power consumption exceeds the budget limit. If each component is responsible for adhering to its own power budget, this is helpful in situations where the response time of the component is shorter than the response time of controlling system 107.

From time to time, controlling system 107 may receive an input from first external sensor 113 or second external sensor 115 and, in response thereto, modify one or more power constraints or configuration parameters. For example, overall power consumption may be severely constrained due to a power failure, or if a particular location exceeds a predetermined room temperature threshold, then all components proximate to that location might be constrained to a total power consumption which is considerably less than current (or recent) power consumption. By means of input/output device 117, a human operator can manually place ad-hoc constraints or relax existing constraints, according to external considerations (i.e., short-term peak performance). Similarly, the operator may change various optimization parameters, for example, by modifying task priorities or by relaxing fairness requirements.

Controlling system 107 may instruct first hardware component 103 or second hardware component 105 to change its configuration. A configuration change includes any of: (a) shutting the component down or putting the component into a low-power consumption (standby) mode for a limited or indefinite time, (b) changing a component setting such as frequency and/or voltage, or (c) turning off some subcomponents of the component (like RAM, hard disks, or network adapters). Such changes may have a negative effect on component throughput, but one function of controlling system 107 is to assess controlled system 101 for the purpose of determining which change or changes will provide the least degradation of overall throughput.

Controlling system 107 controls assignment of tasks to first and second hardware components 103, 105. Controlling system also controls migration of tasks from first hardware component 103 to second hardware component 105, and from second hardware component 105 to first hardware component 103. In order to implement these assignments and migrations, controlling system 107 may be provided with a list or set of permissible hardware components to which a given task or category of tasks may be assigned, a speed estimation algorithm for estimating execution speed of a task on every permissible hardware component, and a resource estimation algorithm for estimating time and bandwidth required for a potential migration. However, these estimation algorithms and task lists are greatly simplified if every single task is permissible on a set of substantially identical hardware components.

Figure 2:
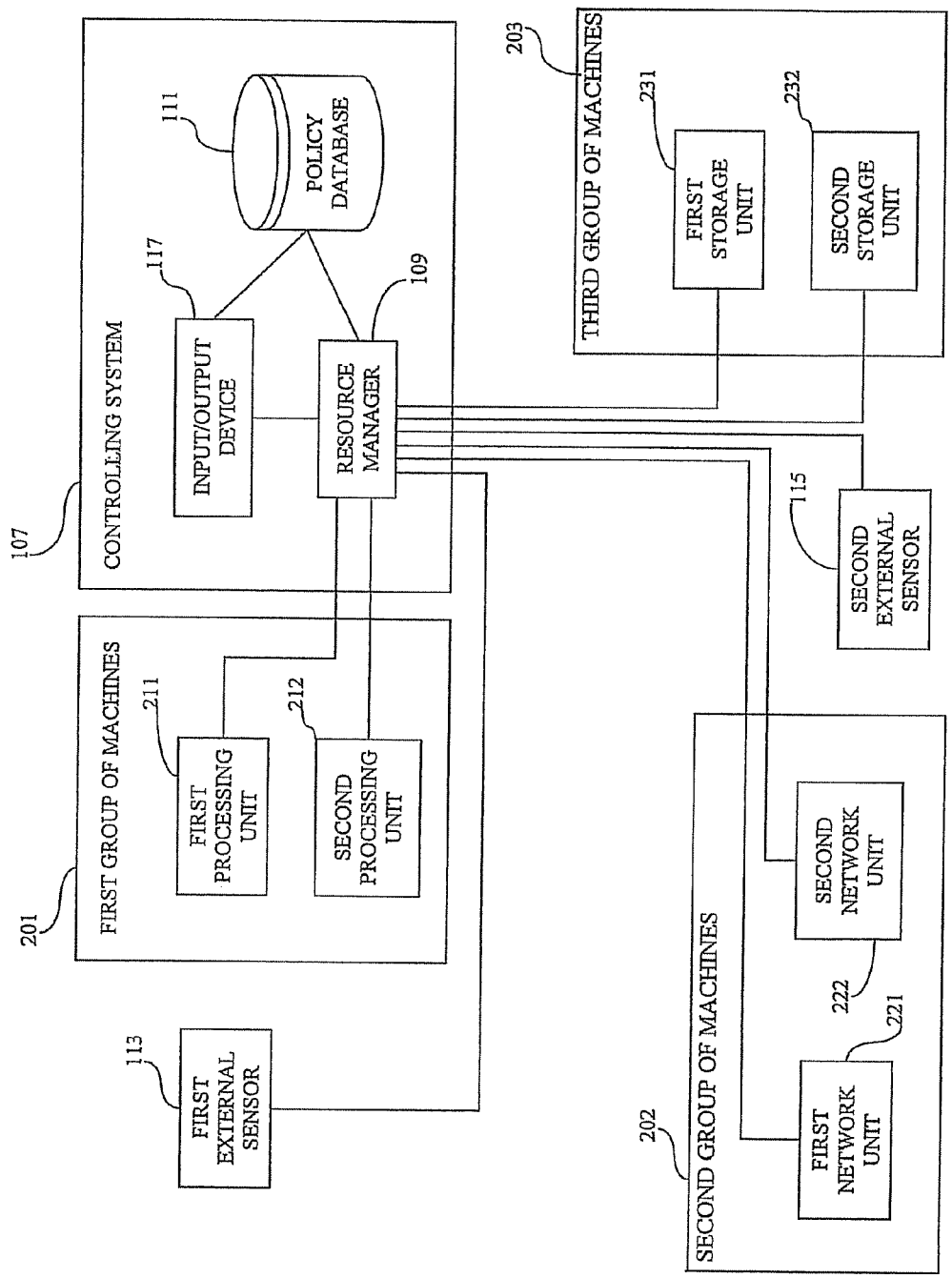
FIG. 2 is a block diagram illustrating a further exemplary embodiment of a system for maximizing the throughput of a computer system under peak power constraints.

FIG. 2 is a block diagram illustrating a further exemplary embodiment of a system for maximizing the throughput of a computer system under peak power constraints. The embodiment of FIG. 2 is based upon the exemplary system depicted in FIG. 1 wherein controlled system 101 (FIG. 1) includes M groups of machines, M representing a positive integer. For example, controlled system 101 of FIG. 1 may include a first group of machines 201 (FIG. 2), a second group of machines 202, and a third group of machines 203. Each group contains at most K identical machines, where K is a positive integer greater than one, possibly with additional resources shared among these K identical machines. Machines in different groups need not be identical. For example, first group of machines 201 includes a first processing unit 211 and a second processing unit 212. Illustratively, first and second processing units 211, 212 may each be implemented, for example, using a CPU, a blade having one or more CPUs, or a computer server.

First and second processing units 211, 212 are shown for purposes of illustration, as first group of machines 201 could include any number of processing units greater than zero. In the case of a blade implementation, a single chassis could be employed containing at most K blades and an Ethernet switch module. This chassis could possibly be accompanied by a dedicated storage server, with each blade running a Linux operating system. Each machine, which in this example includes each of K blades, is executing zero or more tasks assigned thereto by resource manager 109. Resource manager 109 is illustratively implemented using a database server or web server. The assignment of tasks to machines may be determined in advance, may change with time, and/or may be determined exogenously (by a human operator, for instance). Optionally, each task is assigned a corresponding level of priority.

Second group of machines 202 includes a first network unit 221 and a second network unit 222. However, first and second network units 221, 222 are shown for purposes of illustration, as second group of machines 202 could include any number of network units greater than one. First and second network units 221, 222 are illustratively implemented using network adapters. Third group of machines 203 includes a first storage unit 231 and a second storage unit 232. However, first and second storage units 231, 232 are shown for purposes of illustration, as third group of machines 203 could include any number of storage units greater than one. First and second storage units 231, 232 are illustratively implemented using hard disk drives, storage drives for magnetic tape, or any other type of data storage drive that includes a computer readable storage medium.

Each group of machines 201, 202, 203 may be capable of controlling its maximum power consumption so as to adhere to a given limit called a power budget. Alternatively, each machine in each group of machines 201, 202, 203 may be capable of controlling its maximum power consumption so as to adhere to the power budget. Such control may be achieved, for example, by measuring actual power consumption at fixed or repeated intervals (e.g., every 2 milliseconds) and throttling the machine (i.e., decreasing CPU frequency) whenever the actual consumption approaches or exceeds the power budget limit. This limit can be changed in fixed intervals, such as every one second.

Controlling system 107 (FIGS. 1 and 2) assigns a power budget to each of the M machine groups or, alternatively, to each machine. The power budgets must satisfy a constraint that the sum of power budgets cannot exceed a limiting value $E_{max}$ that was given to controlling system 107. For example, controlling system 107 can possibly split the total power budget equally among the M groups by assigning a budget of $E_{max}/M$ to each group, but this allocation could possibly be improved, for example, if the various groups of machines (1) run different workloads, (2) contain different machines in terms of brand, model, or architecture, or (3) contain a different number of machines. Additionally, controlling system 107 guarantees certain fairness conditions, such that each group of machines may receive a minimum power budget of at least $E_{max}/8M$, unless a smaller budget suffices for that group to handle its workload (i.e., in the case of a web server that receives very few hits).

Alternatively or additionally, controlling system 107 may assign tasks to individual machines. More precisely, each task is associated with a particular group of the M groups (fixed in advance), and controlling system 107 assigns the task to one of the machines in the particular group. This assignment can be changed over time. However, a certain overhead is incurred in changing the assignment in terms of latency caused by moving data. Controlling system 107 receives details regarding each machine, such as its utilization and power consumption, so as to identify over utilized and underutilized machines, and to transfer tasks from the former to the latter if the underutilized and over utilized machines are in the same group.

Figure 3:
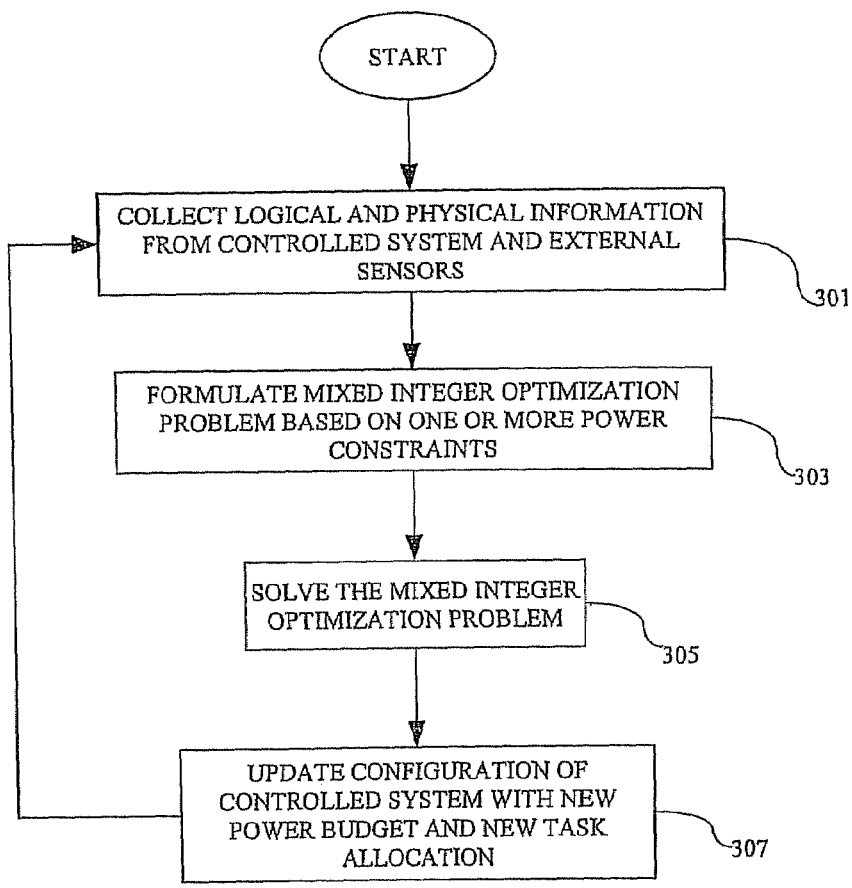
FIG. 3 is a flowchart illustrating an exemplary method for maximizing the throughput of a computer system under peak power constraints.

FIG. 3 is a flowchart illustrating an exemplary method for maximizing the throughput of a computer system under peak power constraints. The process commences at block 301 where logical and physical information is collected from controlled system 101 (FIG. 1) and external sensors (such as first external sensor 113 and second external sensor 115). Next, a mixed integer optimization problem is formulated based upon one or more power constraints (FIG. 3, block 303). Formulation of this mixed integer optimization problem is described in greater detail hereinafter. The mixed integer optimization problem is solved (block 305). The configuration of controlled system 101 (FIG. 1) is updated with a new power budget and new task allocations (FIG. 3, block 307). The process then loops back to block 301.

The mixed integer optimization problem of block 303 is formulated as follows. One objective of controlling system 107 (FIGS. 1 and 2) is to maximize overall throughput of controlled system 101 (FIGS. 1 and 2) subject to given power constraints. The throughput is defined as the total number of instructions of all tasks in the system which are executed per unit of time (i.e., one second). Controlling system 107 also ensures additional properties (such as fairness) by introducing additional constraints that avoid undesired effects. In situations where time allows, controlling system 107 may solve a constrained optimization problem whose objective is to process as many instructions per time unit as possible. Accordingly, this optimization problem is formulated as a mixed integer programming problem to be solved during each of a plurality of time intervals.

The elements of the optimization problem are as follows. There is a set of indices of machines $\{1, \ldots, m\}$, a set of indices of tasks $\{1, \ldots, n)\}$, and a set of indices of CPU frequencies $\{1, \ldots, s\}$. The following attributes of controlled system 101 are inputted to the mixed in integer programming problem as parameters:

$W_i$—the importance (or "priority") of task i:

$M_i$—the machine on which task i is currently run (or 0 if none);

$G_{ij}$—the cost of transferring task i to machine $j \neq M_i$;

$F_k$—the kth CPU frequency value (k=0,1, ..., s);

$H_{ik}$—the average number of cycles per instruction for task i running on a machine operating at the kth CPU frequency (this estimate captures expected I/O and memory delays);

$E_{max}$—Maximum-energy-consumption bound, which controlled system 101 must obey due to current physical conditions, such as temperature or power supply;

$E_{jk}$—the amount of energy per time unit consumed by machine j when machine j is operating at frequency $F_k$;

B—a task-fairness parameter representing the maximum possible ratio between the number of CPU cycles planned for a single task and that of an average task.

Variables. The mixed integer linear programming problem looks for a currently optimal configuration for the managed system. This configuration includes assignment of tasks to machines and an allocation of an energy "budget" for each machine. The mixed integer linear programming problem is solved using an algorithm that uses one or more of the following decision variables:

$z_j$—a Boolean variable indicating whether machine j is active or not;

$X_{ij}$—a Boolean variable indicating whether or not task i is assigned to machine j;

$y_{jk}$—a Boolean variable indicating whether or not machine j is working at frequency $F_k$;

$f_{ijk}$—a continuous variable representing the number of CPU cycles per time unit that is planned for task i on machine j running at the kth CPU frequency. Note that each task is processed by only one machine having a CPU that operates at only one frequency;

$v_{ij}$—a continuous variable representing the number of instructions per time unit that is planned for task i on machine j. Each task is processed by only one machine;

$u_j$—a continuous variable representing the energy upper bound ("budget") allocated to machine j;

Objective function. The algorithm solves the problem of maximizing the total planned number of instructions per time unit. This quantity of instructions is equal to $$\sum_{i=1}^{n} \sum_{j=1}^{m} W_i v_{ij}.$$

In addition, the algorithm penalized the transferring of tasks from one machine to another; this quantity is equal to $$\sum_{i=1}^{n} \sum_{j \neq M_i} G_{ij} x_{ij}.$$

Hence, the algorithm's objective function is given by $$\sum_{i=1}^{n} \left( \sum_{j=1}^{m} W_i v_{ij} - \sum_{j \neq M_i} G_{ij} x_{ij} \right)$$

Constraints. The optimization is subject to constraints as follows. In the sequel, let $[t]=\{1, \ldots, t\}$.

Consistency constraints:

$x_{ij} \leq z_j$ for all $i \in [n], j \in [m]$ meaning that the tasks can be assigned only to active machines;

$$\sum_{j=1}^{m} x_{ij} = 1 \text{ for all } i \in [n]$$

meaning that each task is assigned to a single machine;

$$\sum_{k=0}^{s} y_{jk} = z_j \text{ for all } j \varepsilon [m]$$

meaning that one frequency has to be selected for each machine;

$f_{ijk} \leq F_s x_{ij}$ for all $i \in [n], j \in [m], k \in [s]$ meaning that task execution takes place only on assigned machines;

$f_{ijk} \leq F_k y_{jk}$ for all $i \in [n], j \in [m], k \in [s]$ meaning that task execution takes place only at assigned CPU frequency;

$$v_{ij} \le \sum_{k=1}^{s} f_{ijk}/H_{ik} \text{ for all } j \in [m]$$

meaning that the number of instructions planned is proportional to the number of cycles planned, according to that task's effectiveness at that frequency.

$$\sum_{j=1}^{m}\sum_{k=1}^{s} f_{ijk} \ge \frac{B \cdot W_i}{\sum_{l=1}^{n} W_l} \cdot \sum_{j=1}^{m}\sum_{k=1}^{s} F_k y_{jk} \text{ for all } i \in [n]$$

meaning that the number of cycles planned for a task is at least a B-fraction the number of cycles planned for an average task.

$$\sum_{k=1}^{s} E_{jk} Y_{jk} \le u_j \text{ for all } j \in [m]$$

representing an energy budget constraint;

$$\sum_{j=1}^{n} u_j \le E_{\max}$$

representing the total energy constraint.

Remarks. A preferred embodiment may generalize or specialize the above by having some or all of the following properties.

Machines may each have different maximum CPU frequencies, and this property may be modeled by letting s be the maximum possible frequency and adding the constraint $y_{jk}=0$ whenever machine j cannot run at the kth CPU frequency.

Tasks cannot be transferred to other machines (i.e., task i must be assigned to machine $M_i$).

The cost of transferring a task does not depend on the target machine, i.e., $G_{ij}$ is the same for all $j \ne M_i$.

The m machines are partitioned into p groups, and a task can only be transferred to machines in the same group, i.e., $G_{ij}=\infty$ for all j in a different group than $M_i$.

The total energy consumption of a subset $J \subset [m]$ of the machines might be limited to some amount $E_J$ (e.g., due to power failure or infrastructure), which is modeled by adding the constraint $$\sum_{j \in J} u_j \le E_J$$

The number of cycles planned for task i is limited by a bound $C_i$ (e.g., to model task serving a limited number of requests), which is modeled by adding the constraint $$\sum_{j=1}^{m} v_{ij} \le C_i$$

Additional fairness constraints can limit the ratio between the number of instructions planned for task i and that planned for task i' by some parameters $L_1, L_2 > 0$ (e.g., to make sure these tasks can progress simultaneously), which is modeled by adding the constraint $$L_1 \sum_{j=1}^{m} v_{ij} \le \sum_{j=1}^{m} v_{i'j} \le L_2 \sum_{j=1}^{m} v_{ij}$$

Updating the configuration of controlled system 101 (FIG. 1) as described in block 307 of FIG. 3 may, but need not, include one or more of the following processes. Task scheduling and assignment may be optimized by scheduling a first task to be performed by at least one of the plurality of CPUs simultaneously with a second task to be performed by at least one of the plurality of disk drives. At least one CPU of the plurality of CPUs may be powered down, thereby scheduling a third task to be performed by fewer CPUs of the plurality of CPUs. At least one of the plurality of disk drives may be powered down, thereby scheduling a fourth task to be performed by fewer disk drives of the plurality of disk drives. A lower performing CPU of the plurality of CPUs may be allocated to a fifth task. A lower performing disk drive of the plurality of disk drives may be allocated to a sixth task. A seventh task and an eighth task may be scheduled to execute simultaneously on the plurality of CPUs, wherein the sixth and seventh tasks are independent of each other.

As described above the parameters to this model are given to the system based on the system configuration and recent estimates about the task resource requirements. Thus, every time the mixed-integer program is solved, the parameters may have different values, yielding a different solution. Similarly, new constraints may be added, permanently or temporarily, either by an operator or as an automatic response to existing conditions, again leading to changes in the solution.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for maximizing throughput of a computer system in the presence of one or more power constraints, the method comprising:

repeatedly or continuously optimizing task scheduling and assignment for each of a plurality of components of the computer system, wherein the components include a plurality of disk drives and a plurality of central processing units (CPUs) each operating at a corresponding operating frequency; and adjusting the corresponding operating frequencies of one or more CPUs of the plurality of CPUs to maximize computer system throughput under one or more power constraints;

wherein said optimizing task scheduling and assignment, and said adjusting the corresponding operating frequencies of one or more CPUs, are performed by solving a mathematical optimization problem using a first methodology over a first time interval and a second methodology over a second time interval longer than the first time interval;

wherein the first methodology comprises a short term heuristic solver for adapting to computer system changes that occur over the first time interval, and the second methodology comprises a long term solver for adapting to computer system changes that occur over the second time interval, wherein the second methodology has greater accuracy and greater computational complexity than the first methodology;

wherein said optimizing task scheduling and assignment further includes scheduling a first task to be performed by at least one of the plurality of CPUs simultaneously with a second task to be performed by at least one of the plurality of disk drives;

wherein said optimizing task scheduling and assignment further includes scheduling a first task to be performed by at least one of the plurality of CPUs simultaneously with a second task to be performed by at least one of the plurality of disk drives, or wherein said optimizing task scheduling and assignment further includes scheduling a first task and a second task to execute simultaneously on the plurality of CPUs;

wherein the first and second tasks are independent; and wherein a mixed integer linear program is employed to solve the mathematical optimization problem.

* * * * *